Aug. 29, 1950   C. GUILER ET AL   2,520,501
CONNECTOR
Filed Jan. 13, 1949   2 Sheets-Sheet 1
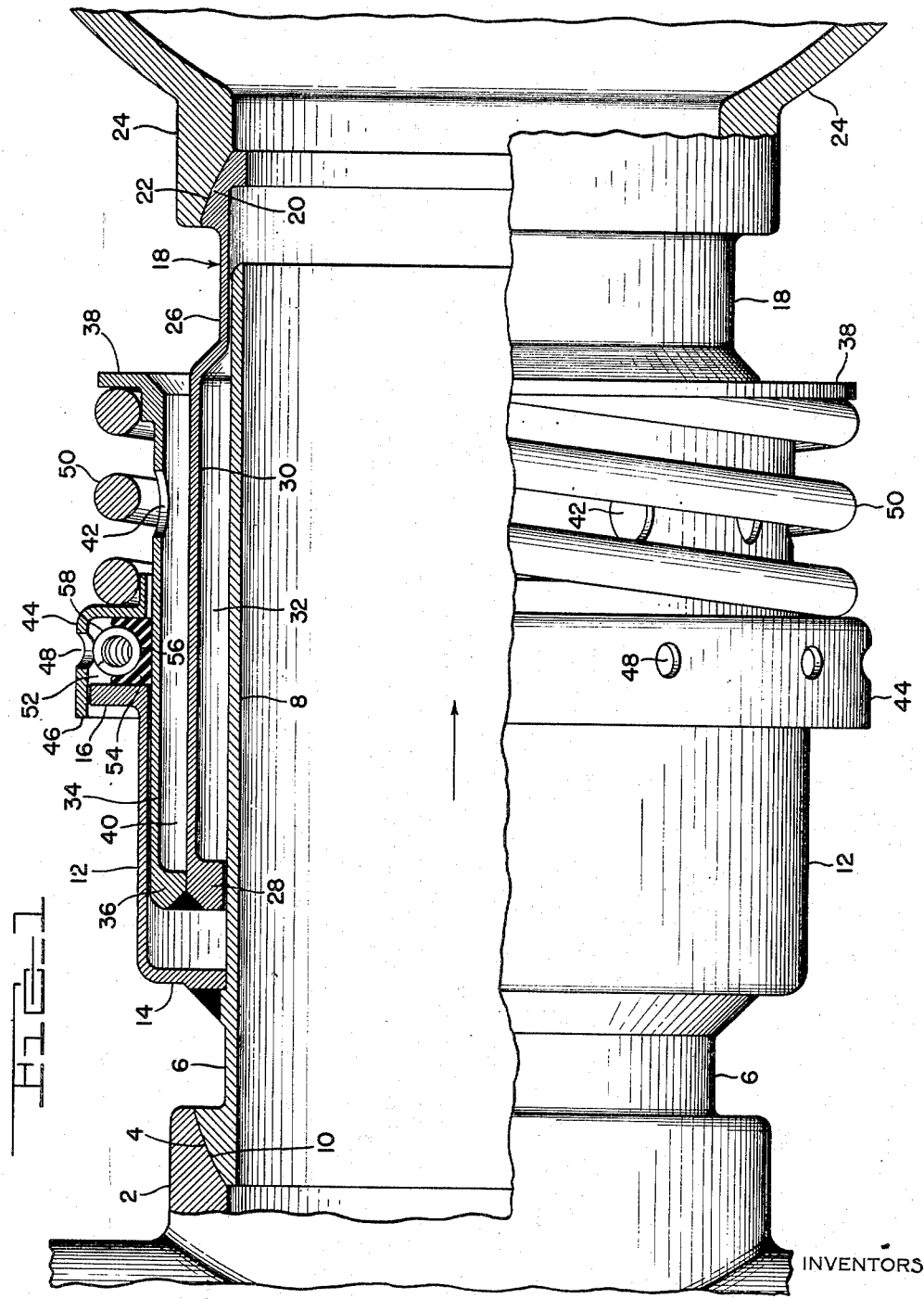
INVENTORS,
CAMERON GUILER &
ARAM KALENIAN
BY Martin J. Carroll
ATTORNEYS.

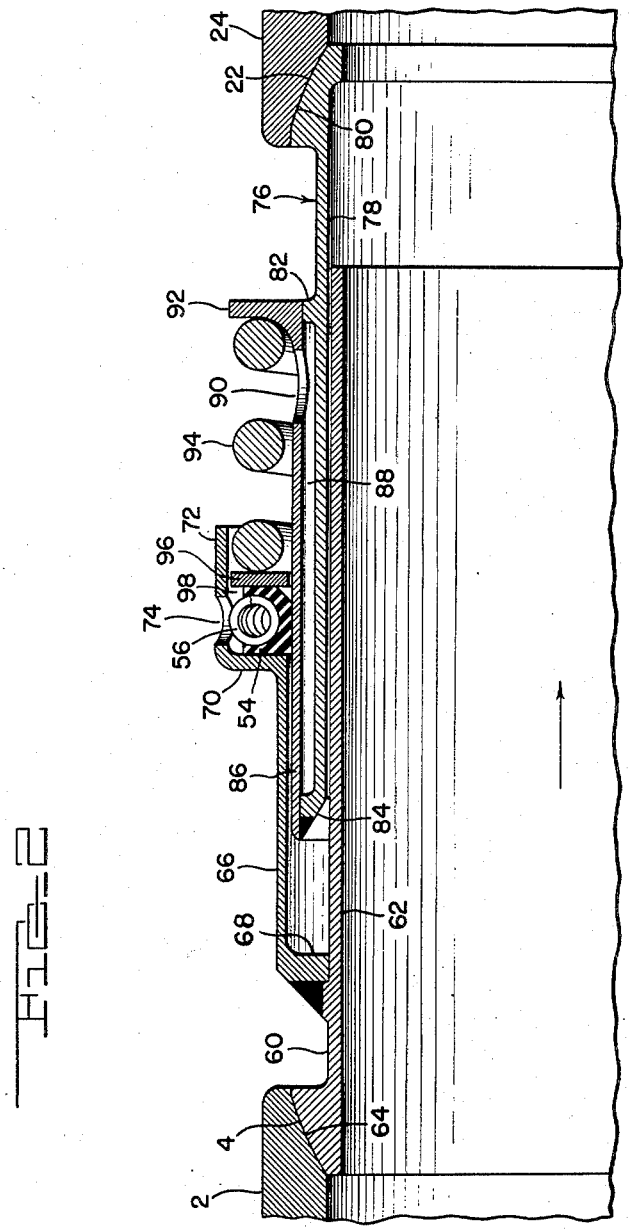

Patented Aug. 29, 1950

2,520,501

UNITED STATES PATENT OFFICE 2,520,501

CONNECTOR

Cameron Guiler and Aram Kalenian,
Westboro, Mass.

Application January 13, 1949, Serial No. 70,767

9 Claims. (Cl. 285—162)

This invention relates to a connector and more particularly to a connector for use between the cylinder head of an engine and the exhaust header. In airplane engines and the like the gas is exhausted from the engine at temperatures in the neighborhood of 1900° F. These gases are delivered from each of the cylinder heads to an exhaust header. Because of the high temperature of the gases, vibration of the engine and misalignment, it is necessary that the connection be flexible and be able to withstand high temperature. In addition, the fitting must be gas tight to prevent escape of the exhaust gases. Various types of connectors have been used, but those in present use have not proved to be successful for various reasons.

It is therefore an object of our invention to provide a gas tight connector which can handle hot gases.

Another object is to provide such a connector which can operate satisfactorily when the distance between the two parts being connected varies.

Still another object is to provide a gas tight connector which will operate satisfactorily regardless of misalignment and/or torque inserted on the parts being connected.

These and other objects will be more apparent after referring to the following specification and attached drawings, in which:

Figure 1 is a view, partly in section, of one embodiment of our invention; and

Figure 2 is a sectional view of a second embodiment of the invention.

Referring more particularly to Figure 1 which shows the preferred embodiment of our invention, the reference numeral 2 indicates a member attached to and extending from the cylinder head of an engine. Member 2 is provided with a spherical seat 4 for receiving one section 6 of our connector. The member 6 consists of a tube 8 having a spherical bearing surface 10 which is received in the spherical portion 4 and a tubular member 12 coaxial with the tube 8 and spaced therefrom by means of a flange 14 which extends inwardly to the tube 8. The flange 14 is welded to the tube 8 around the periphery thereof as shown in Figure 1. An outwardly extending abutment 16 is provided on the end of the tubular member 12 remote from the bearing surface 10. The connector is provided with a second section 18 which surrounds the tube 8. The section 18 is provided with a spherical bearing surface 20 which sits in a spherical portion 22 attached to an exhaust header 24. The section 18 has two spaced apart short tubular portions 26 and 28 which have an inside diameter only slightly greater than the outside diameter of tube 8. Between the portions 26 and 28 and attached thereto is an enlarged tubular portion 30 which is spaced from the tube 8 to provide a dead air space 32. Welded to the tubular portion 28 is a tubular member 34 having an inwardly extending flange 36 and an outwardly extending abutment flange 38. The tubular portion 34 is spaced from the tubular portion 30 by means of flange 36 to provide an air space 40. A plurality of holes 42 may be provided around the periphery of the member 34 adjacent the abutment 38. The outside diameter of portion 34 is slightly less than the inside diameter of 12. Slidably mounted on the member 34 is a Z-shaped member 44 having a flange 46 extending parallel to the axis of the connector over the abutment 16. A plurality of holes 48 may be provided around the periphery of the flange 46. The member 44 also provides an abutment for a coil spring 50 which surrounds the tube 34 and bears on the abutment 38. A space 52 is provided between the abutment 16 and the member 44 in which is inserted an annular resilient sealing element 54 which is preferably made of a self-lubricating heat resisting material such as polymers of polytetrafluoroethylene. This is a resin which is sold under the trade name of "Teflon." The internal diameter of the sealing element 54 is slightly less than the outside diameter of the member 34 which it surrounds. The outside portion of the sealing member 54 is provided with a channel 56 for receiving a garter spring 58.

The operation of the device is as follows:

As the gases pass through the connector in the direction of the arrow, they will be prevented from escaping therefrom because of the sealing effect of the member 54. This sealing is effected as follows:

The spring 58 urges the resilient member against the outside wall of the member 34 and the spring 50 forces the member 44 toward the abutment 16, thus providing sealing along the sides of the sealing member 54. The spaces 32 and 40 protect the sealing member 54 from the extremely high temperatures of the exhaust gases. Additional cooling is provided by the holes 42 and 48. It will be seen that the sections 6 and 18 of the connector are free to slide over each other as the length thereof increases and decreases due to expansion and contraction. The spring 50 will always exert a substantially uniform pressure on the member 54, thus providing uniform sealing effect. Spherical bearing surfaces 10 and 20 compensate for misalignment of the parts being connected.

Figure 2 shows a second modification of our invention. In this embodiment one section 60 of the connector (corresponding to section 6 of the connector shown in Figure 1) has a tubular portion 62 with a spherical bearing surface 64 at its end which is received in the spherical portion 4 of the member 2. Surrounding the tube 62 and spaced therefrom is a cylindrical portion 66 having an inwardly extending flange 68 which is welded to the tube 62 as shown. A flange 70 extends outwardly from the cylinder 66 at the end remote from the flange 68. A cylindrical portion 72 is attached to the outer portion of the flange 70 and extends away from the portion 66. Holes 74 are provided around the periphery of the cylindrical portion 72. The connector is provided with a second section 76 having a tubular portion 78 which telescopes over the tubular portion 62. The outboard end of the portion 78 has a spherical bearing surface 80 which is received in the spherical portion 22 of the header 24. The portion 78 is provided with outwardly extending flanges 82 and 84 to which are welded a tubular portion 86. An air space 88 is provided between the tubular portions 78 and 86. Holes 90 are provided around the periphery of the tubular portion 86 in the same manner as in our first embodiment. On the header end of the tubular portion 86 is an outwardly extending flange or abutment 92 against which bears one end of a coil spring 94. The other end of the coil spring bears against a disk 96 which is slidably mounted on the tubular portion 86. A space 98 is provided between the flange 70 and disk 96 for receiving the sealing element 54 and garter spring 56, these being identical to the sealing member and garter spring in Figure 1.

This connector operates in substantially the same manner as the connector of Figure 1, the main difference being that only one insulating space is provided between various portions of the connector.

While two embodiments of our invention have been shown and described it will be apparent that other adaptations and modifications may be made without departing from the scope of the following claims.

We claim:

1. A connector comprising a cylindrical member, a second cylindrical member slidably mounted on the first cylindrical member, an abutment on one of said cylindrical members, an abutment on the other of said cylindrical members axially spaced from the first abutment, an annular member mounted between said abutments, a spring extending between said annular member and one of said abutments, an annular resilient sealing element between the annular member and the other of said abutments, and a spring urging said sealing element against the cylindrical member adjacent thereto.

2. A connector comprising a cylindrical member, a second cylindrical member slidably mounted on the first cylindrical member, an outwardly extending abutment on one of said cylindrical members, an outwardly extending abutment on the other of said cylindrical members axially spaced from the first abutment, an annular member mounted between said abutments, a spring extending between said annular member and one of said abutments, an annular resilient sealing element between the annular member and the other of said abutments, and a spring surrounding said sealing element.

3. A connector comprising a cylindrical member, a second cylindrical member slidably mounted on the first cylindrical member, a third cylindrical member spaced outwardly from the first cylindrical member and attached thereto, a fourth cylindrical member between the first and third cylindrical members and spaced from the first cylindrical member, said fourth cylindrical member being attached to the second cylindrical member, an outwardly extending abutment on the third cylindrical member, an outwardly extending abutment on the fourth cylindrical member, an annular member slidably mounted on said fourth cylindrical member between said abutments, a spring extending between said annular member and one of said abutments, an annular resilient sealing element between the annular member and the other of said abutments, and a spring surrounding said sealing element.

4. A connector according to claim 3 in which the fourth cylindrical member is provided with holes around its periphery.

5. A connector according to claim 3 in which a tubular member surrounding the sealing element.

6. A connector comprising a cylindrical member, a second cylindrical member slidably mounted on the first cylindrical member, a third cylindrical member spaced outwardly from the first cylindrical member and attached thereto, fourth and fifth cylindrical members between the first and third cylindrical members and spaced from the first cylindrical member and from each other, said fourth and fifth cylindrical members being attached to the second cylindrical member, an outwardly extending abutment on the third cylindrical member, an outwardly extending abutment on the fourth cylindrical member, an annular member slidably mounted on said fourth cylindrical member between said abutments, a spring extending between said annular member and one of said abutments, an annular resilient sealing element between the annular member and the other of said abutments, and a spring surrounding said sealing element.

7. A connector according to claim 6 in which a tubular member surrounds the sealing element.

8. A connector comprising a cylindrical member, a second cylindrical member slidably mounted on the first cylindrical member, an abutment on one of said cylindrical members, an abutment on the other of said cylindrical members axially spaced from the first abutment, an annular member mounted between said abutments, a spring extending between said annular member and one of said abutments, and an annular resilient sealing element between the annular member and the other of said abutments bearing against the cylindrical member adjacent thereto.

9. A connector comprising a cylindrical member, a second cylindrical member slidably mounted on the first cylindrical member, a third cylindrical member spaced outwardly from the first cylindrical member and attached thereto, a fourth cylindrical member between the first and third cylindrical members and spaced from the first cylindrical member, said fourth cylindrical member being attached to the second cylindrical member; an outwardly extending abutment on the third cylindrical member, an outwardly extending abutment on the fourth cylindrical member, an annular member slidably mounted on said fourth cylindrical member between said abutments, a spring extending between said annular member and one of said abutments, and an annular resilient sealing element between the annular member and the other of said abutments.

CAMERON GUILER.
ARAM KALENIAN.

REFERENCES CITED

The following references are of record in the file of this patent:

UNITED STATES PATENTS

| Number | Name | Date |
|---|---|---|
| 2,127,073 | Topping | Aug. 16, 1938 |
| 2,402,157 | Griswold | June 18, 1946 |
| 2,467,312 | Jack | Apr. 12, 1949 |